Jan. 22, 1963  L. A. LENTINI  3,074,162
CORK BORER
Filed Dec. 26, 1961

INVENTOR:
Leo A. Lentini
BY:
Chester J. Giuliani
Philip T. Liggett
ATTORNEYS

United States Patent Office 3,074,162
Patented Jan. 22, 1963

---

3,074,162
CORK BORER
Leo A. Lentini, Palatine, Ill., assignor to Universal Oil Products Company, Des Plaines, Ill., a corporation of Delaware
Filed Dec. 26, 1961, Ser. No. 162,169
7 Claims. (Cl. 30—142)

This invention relates to boring tools and more particularly to an improved cork borer useful in cutting circular holes of varying depth in cork, rubber or plastic stoppers, plugs, couplings, and the like.

A cork borer of conventional design typically comprises a metal tube sharpened at one end and fitted with handles at the other end. Such a tool, which is capable of cutting only a straight-through hole in a stopper, that is, a hole which completely pierces the work from one side thereof to the other, has proven unsatisfactory in many applications incident to the assembly of laboratory bench-scale apparatus. It is frequently desirable to form holes which do not extend completely through the work but which terminate at some lesser predetermined depth from the surface thereof. This is usually accomplished by drilling or counter sinking the work on a drill press. However, cork and rubber—the most common construction materials for laboratory stoppers—are poorly suited to a drilling operation; more often than not, the resulting holes are out-of-round with ragged edges; attempts to drill large diameter holes frequently proved abortive to the extent of shearing the sidewall of the work.

The present invention obviates such difficulties and furnishes a means of cutting clean, circular holes of variable depth in cork, rubber or plastic stoppers with speed and facility. One embodiment of the invention is designed to operate as a core extractor, while another embodiment functions as a combination borer-extractor. Although the present disclosure is directed primarily to a hand tool, it will be obvious that the basic structure herein described may readily be mechanized or motor-driven according to any one of numerous means, and such refinements are considered as embraced within the scope of the invention.

Briefly stated, the instant boring tool comprises a hollow-walled, open-ended cylindrical tube, or one having a longitudinal well formed within its sidewall extending parallel to the central longitudinal axis thereof. A rotary shaft, mounted within this hollow space or well, extends substantially the full length of the tube. A circumferentially elongated recess is formed in the inner sidewall of the tube at or near the bearing or cutting end of the tube. An arcuate cutting blade, preferably thin, flat and razor-edged, is rigidly secured at one end thereof to the rotary shaft and is pivotally rotatable therearound in a plane bridged by the recess. This cutting blade is so shaped and sized as to be fully retractable into the recess upon appropriate rotation of the shaft. Means are provided for rotating and locking the shaft and for rotating the entire tube about its central longitudinal axis. The above described apparatus may be inserted into an annular cut previously made by a conventional cork borer, its cutting blade initially being fully retracted, and will then perform a transverse cut at the desired depth as the cutting blade is gradually worked inwardly and the tube itself rotated relative to the work so as to cleave the cylindrical core in the plane of the cutting blade. The freed core may then be lifted out when the tube is withdrawn from the work. In such case the device functions as a core extractor; however, where it is desired to make both annular and transverse cuts with a single tool, this is easily accomplished by honing the bearing end of the cylindrical tube to an annular knife edge, or by fitting the bearing end to a separate annular knife, preferably fashioned from hardened alloy steel.

The construction and assembly of the instant boring tool may be best described in conjunction with the accompanying drawing to which reference is now made. While the drawing is presented as illustrative of the best mode of practicing the invention, it is understood that the specific elements therein set forth have a full range of well-known equivalents in the mechanical arts and it is not therefore intended that the broad scope of this invention be limited by the drawing to any greater extent than as otherwise required by the appended claims.

Figure 1:
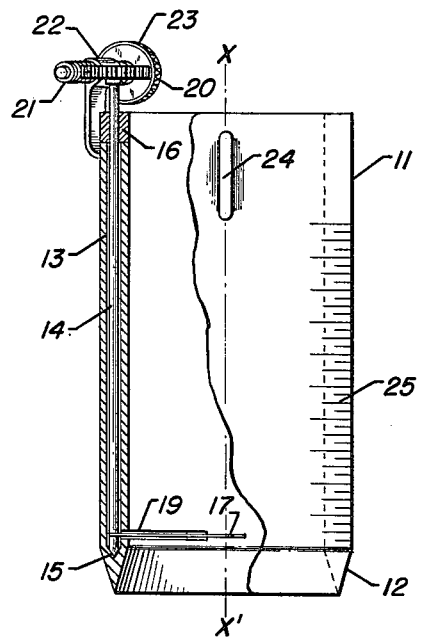
FIGURE 1 is a partial sectional elevation view of one embodiment of the present boring tool.

With reference now to FIGURE 1, there is shown in elevation an open-ended cylindrical tube 11, the central longitudinal axis of which is defined by line $x$—$x'$. The lower or cutting end of tube 11 forms an annular knife member 12. Extending longitudinally through the cylindrical wall of tube 11, parallel to axis $x$—$x'$, is an elongated chamber or well 13. A rotary shaft 14 is rotatably mounted within well 13, the lower end of shaft 14 being tapered to fit into a conical seat 15; the upper portion of shaft 14 is supported by a friction bushing 16. A circumferential slot 19 is formed in the wall of tube 11 adjacent knife 12. Slot 19 is open to the hollow interior of tube 11 and may or may not project completely through the sidewall; slot 19 overlies and communicates with well 13. A thin arcuate cutting blade 17 is rigidly attached at one end thereof to shaft 14 so that it may be pivoted inwardly, as shaft 14 is rotated, in a horizontal plane which passes through slot 19.

Figure 2:
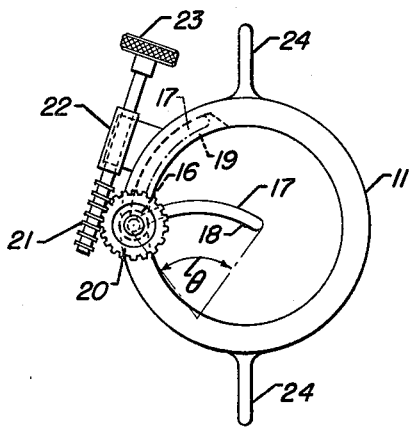
FIGURE 2 is a top plan view of the tool of FIGURE 1.

The relationship between blade 17 and slot 19 is more clearly illustrated in the top plan view of FIGURE 2. Here blade 17 is shown in its most fully extended position in which the free end of the blade and shaft 14 are aligned on a diameter of tube 11. Blade 17 preferably has the shape of a sector of an annulus with a radius of curvature equal to that of the cylindrical wall of tube 11; slot 19 has a sufficient peripheral length and width as will accommodate blade 17. When shaft 14 is turned a sufficient distance counterclockwise, blade 17 will be completely received by slot 19 and will no longer protrude beyond the inner surface of tube 11. Clockwise rotation of shaft 14 causes blade 17 to be advanced inwardly to the position herein indicated. The concave edge 18 of blade 17 is the actual cutting edge thereof and will effect a transverse cut of a core of material when tube 11 is rotated counterclockwise by means of handles or finger-grips 24. If desired, the convex edge, or both edges, of blade 17 may be cutting edges, in which case tube 11 may be turned in a clockwise direction or in either direction to accomplish a transverse cut; however, a smoother cut with a minimum of manual effort is obtained when the concave edge of blade 17 is employed as the cutting edge. In order to enable a completely circular transverse cut to be made—as distinguished from an annular transverse cut—blade 17 should be of sufficient length as will intersect axis $x$—$x'$ during some part of the rotation of the blade around shaft 14. This requirement will be met provided that angle $\theta$ of FIGURE 2, subtended by the maximum effective length of cutting edge 18, equals or exceeds 60°. Such maximum effective length is defined as the chordal distance between the free end of edge 18 and its point of intersection with the inner surface of tube 11 when said free end is diametrically opposite shaft 14.

A suitable means for rotating and locking shaft 14 is also depicted in FIGURES 1 and 2. The upper end of shaft 14, which is extended through bushing 16 a short distance above the upper end of tube 11, is keyed to a worm wheel 20. A worm 21 is supported and held in mesh with wheel 20 by means of a tangential sleeve 22 which in turn is connected to tube 11. A knob 23 facilitates hand rotation of worm 21. By this means, blade 17 may be gradually worked toward the center of tube 11 while the tube itself is rotated relative to the cork or stopper; the worm gear driving means also effectively locks shaft 14 in any one of its adjusted positions, because the gear ratio may be made sufficiently high so that countertorque exerted by blade 17 on shaft 14 will not displace the latter from its angular position as established by knob 23.

The embodiment of FIGURES 1 and 2 performs both the coring and core-extracting functions. With blade 17 fully withdrawn into slot 19, knife edge 12 is pressed flush against the work and tube 11 is turned, continuously or reciprocally, to produce an annular cut in the same manner as a conventional cork borer. To facilitate attaining the desired depth of cut, a number of longitudinally spaced linear graduations 25 may be provided along the exterior surface of tube 11. When the cutting plane of blade 17 has progressed to the desired depth, blade 17 is then incrementally pivoted inwardly by means of knob 23 while tube 11 is turned relative to the work by means of fingergrips 24, thereby cleaving the cylindrical core of the work transversely to the aforesaid annular cut; the loose core is then extracted by withdrawing tube 11 from the work.

Figure 3:
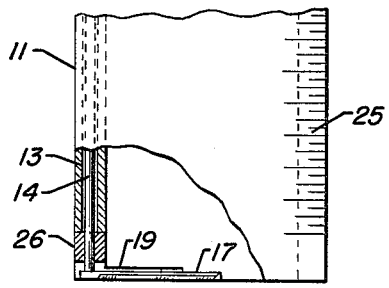
FIGURE 3 is a partial sectional elevation view of the cutting end of another embodiment of the invention.

A modified form of the invention is given in FIGURE 3 wherein only the cutting end of tube 11 is illustrated, the structure of the remaining portion thereof being the same as that of FIGURE 1. Here the annular knife member 12 is omitted. Blade 17 pivots substantially in the plane of the lower or bearing end of tube 11 and is fully retractable into circumferentially elongated recess 19 which is milled from the cylindrical wall of tube 11 at the bearing end thereof. The lower end portion of rotary shaft 14 extends through a friction bushing 26 which restrains the shaft from lateral deflection by the bending moment imparted by blade 17. The use of this embodiment of the boring tool is similar to that of FIGURE 1 except that the annular cut is first made with a separate conventional cork borer; tube 11 is then inserted into the annular cut, blade 17 being initially withdrawn into recess 19, and the core is sliced free by advancing blade 17 inwardly and rotating tube 11. The advantages of the FIGURE 3 embodiment over that of FIGURE 1 are simpler mechanical construction and the fact that the transverse cut produced by blade 17 may be made flush with the terminus of the annular cut.

Figure 4A:
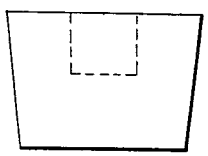
FIGURES 4a, 4b and 4c illustrate representative hole configurations which may be made with this invention.
Figure 4B:
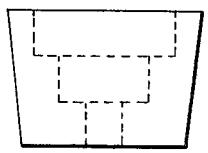
Figure 4C:
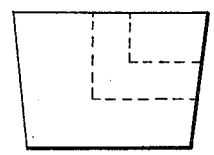

FIGURES 4a, 4b and 4c illustrate exemplary hole configurations which may be made with the instant invention. In FIGURE 4a, the partially bored plug may be used as a pipe or tubing cap. In FIGURE 4b, a plurality of axially spaced concentric holes of successively decreasing diameter is cut in a stopper which is useful as a supporting head for a bench scale double pipe heat exchanger. In FIGURE 4c, a stopper with a 90° bend passageway may be used to charge reactants tangentially into a flask.

Various other modifications of the present invention may be made without departing from the scope and spirit thereof. For example, the longitudinal shaft-receiving well 13 is equivalent to, and therefore includes, a double-walled construction of tube 11 which is hollow completely around its periphery. Two or more blades 17 may be employed in larger size boring tools. If desired, tube 11 may be provided with an extended shank for engagement with the chuck of a power drill, and the worm gear driving means may be replaced with a ratchet-and-pawl or a simple lever.

I claim as my invention:

1. A boring tool comprising a cylindrical tube, a shaft-receiving well formed within the cylindrical wall of the tube extending parallel to the central longitudinal axis thereof, a longitudinally extending rotary shaft disposed within the well, a circumferentially elongated recess formed in said cylindrical wall at one end of the tube, said recess being open both to the hollow interior of the tube and the well adjacent said shaft, a cutting blade connected at one end thereof to the shaft and rotatable inwardly therearound in a plane bridged by said recess, said blade being of such shape and size as to be fully retractable into the recess upon due rotation of said shaft, means for rotating and locking the shaft, and means for rotating the tube about said axis.

2. The tool of claim 1 further characterized in that said cutting blade is arcuate with a radius of curvature equal to that of said cylindrical wall.

3. The tool of claim 2 further characterized in that said arcuate cutting blade is of sufficient length as to intersect the central longitudinal axis of said tube during some part of the rotation of the blade.

4. The tool of claim 1 further characterized in that said means for rotating and locking the shaft comprises a worm gear driving means operatively connected to the shaft and disposed beyond the end of said cylindrical tube which is more remote from said cutting blade.

5. The tool of claim 1 further characterized in the provision of longitudinally spaced linear graduations along the exterior surface of said tube.

6. A boring tool comprising a cylindrical tube, a shaft-receiving well formed within the cylindrical wall of the tube extending parallel to the central longitudinal axis thereof, a longitudinally extending rotary shaft disposed within the well, a circumferential slot formed in said cylindrical wall near one end of the tube, said slot communicating with both the hollow interior of the tube and the well adjacent said shaft, a cutting blade connected at one end thereof to the shaft and rotatable inwardly therearound in a plane bridged by said slot, said blade being of such shape and size as to be fully retractable into the slot upon due rotation of said shaft, means for rotating and locking the shaft, and means for rotating the tube about said axis.

7. The tool of claim 6 further characterized in that the end of said cylindrical tube nearer said cutting blade forms an annular knife edge.

References Cited in the file of this patent

UNITED STATES PATENTS

| | | |
|---|---|---|
| 1,162,901 | Cantey | Dec. 7, 1915 |
| 2,870,836 | Rosato et al. | Jan. 27, 1959 |